US006876871B2

(12) United States Patent
Hirayama et al.

(10) Patent No.: US 6,876,871 B2
(45) Date of Patent: Apr. 5, 2005

(54) PORTABLE INFORMATION TERMINAL

(75) Inventors: Naofumi Hirayama, Tokyo (JP);
Mizuki Tomono, Tokyo (JP); Yoshinori Nakatsuka, Tokyo (JP); Mikiko Arakawa, Iruma (JP); Katsumi Kobayashi, Kawaguchi (JP)

(73) Assignees: Pioneer Corporation, Tokyo (JP);
Pioneer Design Corporation, Tokyo (JP)

( * ) Notice: Subject to any disclaimer, the term of this patent is extended or adjusted under 35 U.S.C. 154(b) by 834 days.

(21) Appl. No.: 09/883,494

(22) Filed: Jun. 19, 2001

(65) Prior Publication Data

US 2002/0016187 A1 Feb. 7, 2002

(30) Foreign Application Priority Data

Jun. 21, 2000 (JP) ........................................ 2000-185806

(51) Int. Cl.⁷ ................................................. H04M 1/00
(52) U.S. Cl. .................. 455/566; 379/433.04; 435/649; 435/660
(58) Field of Search ................................. 345/649, 660; 455/566, 550.1; 379/433.04

(56) References Cited

U.S. PATENT DOCUMENTS 6,788,332 B1 * 9/2004 Cook ....................... 348/14.02
6,791,773 B2 * 9/2004 Nagaoka ..................... 359/833
6,792,292 B1 * 9/2004 Chatani ....................... 455/566

* cited by examiner

Primary Examiner—Ahmad F. Matar
Assistant Examiner—Rasha S. Al-Aubaidi
(74) Attorney, Agent, or Firm—Morgan, Lewis & Bockius LLP

(57) ABSTRACT

A multi-functional portable information terminal is equipped with a display and makes it possible to reuse the information held by a given function for another function. The portable information terminal comprises image range specifying part for specifying a given selected object within a given application windows displayed on a display panel. The terminal also comprises a copy part for copying the image of the selected object to display the copied image in floating on the display panel. The terminal further comprises a pasting part for pasting the selected object displayed in a floating manner onto another application window changed by the operation of a spectrum dial on the display panel.

6 Claims, 16 Drawing Sheets

PORTABLE INFORMATION TERMINAL

BACKGROUND OF THE INVENTION

1. Field of the Invention

The present invention relates to a multi-functional portable information terminal equipped with a display.

2. Description of Related Art

Recently, portable information terminals such as portable telephones have become widespread and have been equipped with a variety of functions such as services for connecting to the Internet.

These portable information terminals are adapted to allow the reception of e-mail and information, such as on shopping or food, according to the services of the Internet to appear on the display equipped on the terminal to serve the user.

Along with the aforementioned multi-functions of the portable information terminal, the user has often desired to process the information received with a given function of the portable information terminal in order to reuse the resulting information on another function.

It can be predicted that these requirements will increasingly grow when the IMT-2000 is implemented which provides a high-speed transmission 200 times faster than the present portable telephones and which is being employed as the worldwide standard scheme for next generation portable telephones.

However, the conventional portable information terminal only allows the received information of various types to appear on the display, but never allows the information to be processed for reuse.

OBJECTS AND SUMMARY OF THE INVENTION

The present invention has been developed to meet the requirements of the user for the aforementioned portable information terminals.

That is, it is an object of the present invention to provide a multi-functional portable information terminal, equipped with a display, which allows information held by a given function to be reused by another function.

To achieve the aforementioned object, the present invention provides a portable information terminal equipped with a plurality of application programs, a display part, and an operating part for displaying an application window on the display part. According to a first aspect of the present invention, the portable information terminal comprises an image range specifying part for specifying an image within a given range in a given application window displayed in said display portion. The terminal also comprises a copying part for copying the image within the range specified by the image range specifying part and for allowing the copied image to remain displayed on the display portion even when the application window displayed on the display portion is changed by said operation portion. The terminal further comprises a pasting part for pasting the image within the specified range, remaining displayed on the display portion by the copying part, onto a window of a changed other application displayed on the display portion.

The portable information terminal according to the first aspect is equipped with application programs for executing a plurality of functions. Each window corresponding to each of the applications is adapted to be displayed on the display portion through the operation of the operation portion.

Suppose an image that is desirably used in another application is contained within the application window being displayed on the display portion. In this case, in the application window, the desired image is specified to identify the copied range with image range specifying part.

Incidentally, the aforementioned image conceptually contains characters.

Then, the desired image specified by the image range specifying part is copied with the copying part, and the copied image is stored in the display portion.

The copied image will remain displayed on the display portion as it is even when the application window displayed on the display portion is changed through the operation of the operation portion.

Then, another application window where the copied image is desirably reused is displayed on the display portion. Here, the pasting part pastes the copied image that remains displayed in the display portion onto the window of the other application displayed in the display portion.

As described above, according to the aforementioned first aspect, the multi-functional portable information terminal makes it possible to easily reuse the information held by a given function in another function. For example, it is made possible to facilitate operation of sending a part of the image, which has been received on the Internet, by affixing the part of the image to e-mail.

To achieve the aforementioned object, in addition to the arrangement according to the first aspect of the present invention, the portable information terminal according to a second aspect of the present invention further comprises an image reversing part for reversing the image specified by said image range specifying part. The image reversing part allows the image specified by the image range specifying part to be a highlighted display in the window, thereby making it possible to identify easily the specified image among the other images and characters within the same window.

To achieve the aforementioned object, in addition to the arrangement according to the first aspect of the present invention, the portable information terminal according to a third aspect of the present invention further comprises a display form changing part for displaying the image copied by said copying part in such a manner as to seemingly float over the window displayed on the display portion. The copying part copies the image and then the display form changing part allows the copied image to be displayed by it being floated over the application window. This prevents the window in the display portion from being mixed up and becoming unsightly upon changing the application window displayed on the display portion.

To achieve the aforementioned object, in addition to the arrangement according to the first aspect of the present invention, the portable information terminal according to a fourth aspect of the present invention further comprises window display part for allowing an operation of said operation portion to display a plurality of application windows one after the other on the display portion in a sliding manner. This makes it possible for the user to change the application window displayed on the display portion in an analog manner.

To achieve the aforementioned object, in addition to the arrangement according to the fourth aspect of the present invention, the portable information terminal according to a fifth aspect of the present invention is characterized in that said window display part displays a plurality of application windows in background colors different from each other.

This makes it possible for the user to easily identify the type of the executable application by the background color of the window displayed on the display portion.

To achieve the aforementioned object, in addition to the arrangement according to the fourth aspect of the present invention, the portable information terminal according to a sixth aspect of the present invention is characterized in that said operation portion allows a dial to be rotated to slide a plurality of application windows and thus display the application windows successively on the display portion. This makes it possible to provide an increase analog sense to the user upon changing the application window displayed on the display portion.

DETAILED DESCRIPTION OF THE PREFERRED EMBODIMENTS

Now, an embodiment of the present invention will be explained below in detail with reference to the accompanying drawings.

Incidentally, it is to be understood that the words in the images express a concept which also includes the window of characters in the following explanations.

Figure 1:
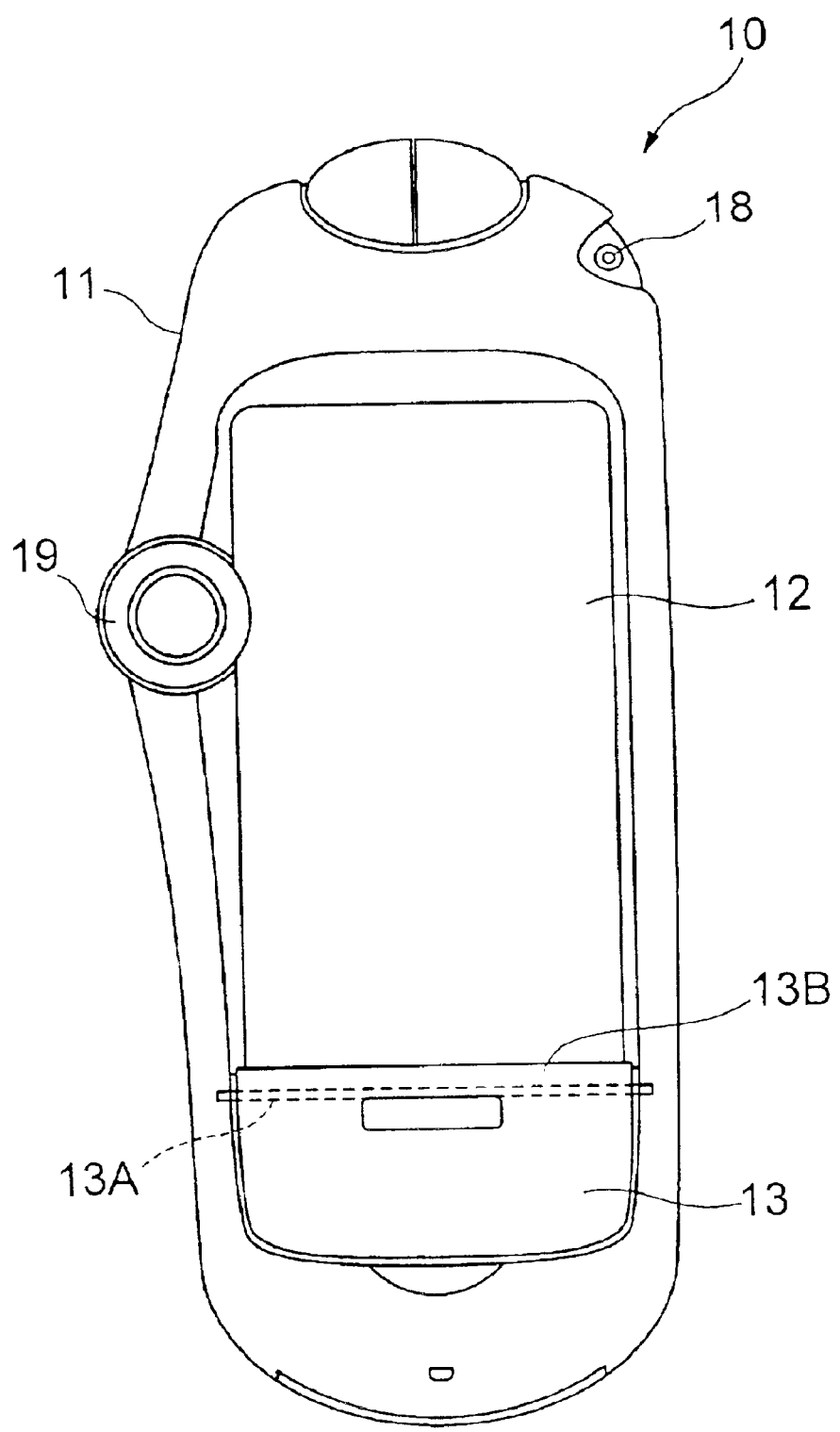
FIG. 1 is a front view illustrating a portable telephone according to an embodiment of the present invention, with the open/close cover being closed.
Figure 2:
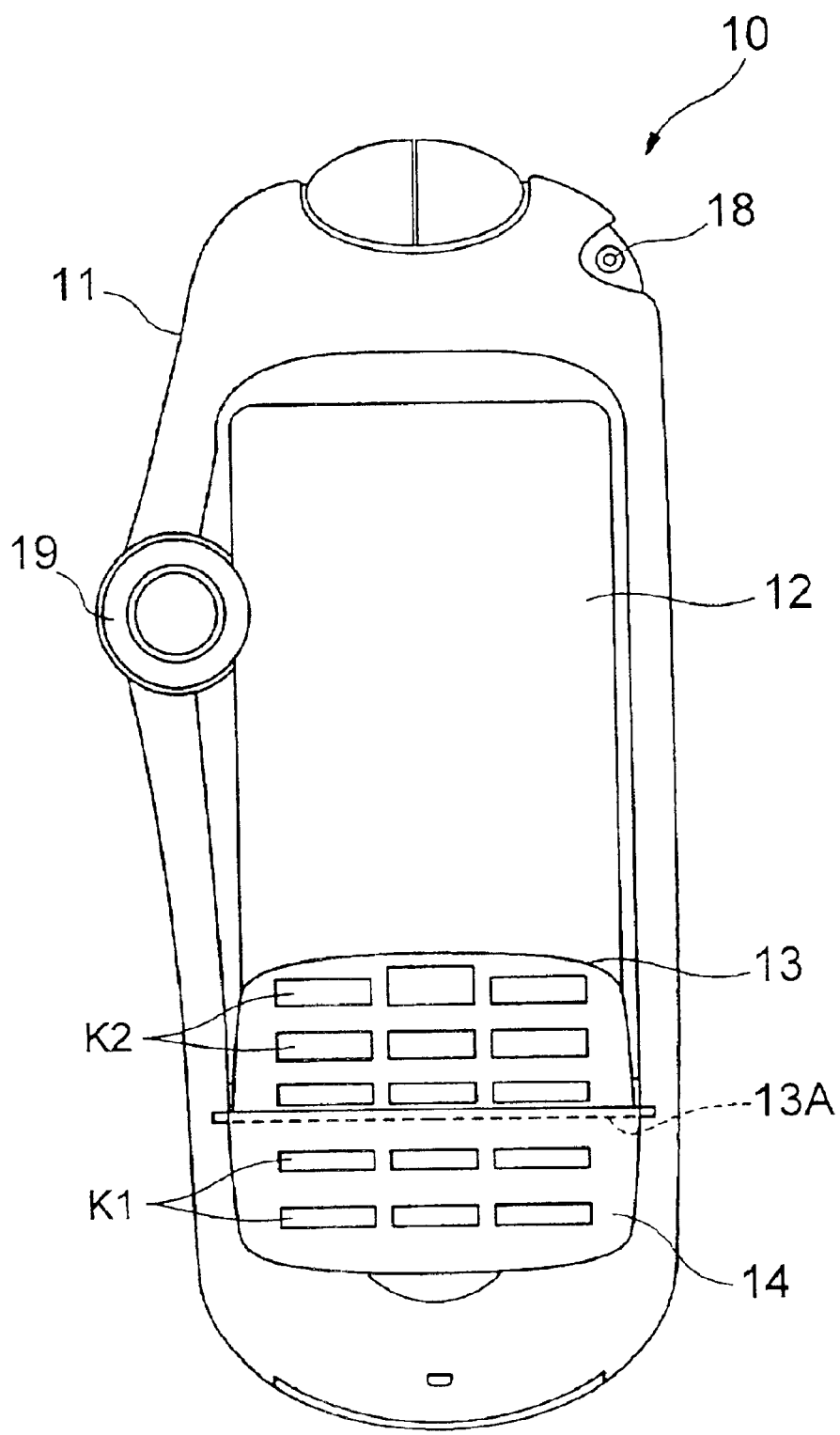
FIG. 2 is a front view illustrating the portable telephone of the present invention with the open/close cover being opened.

FIG. 1 is a front view illustrating a portable telephone according to an embodiment of the present invention, and FIG. 2 is a front view illustrating a form of the portable telephone when operated.

Referring to FIGS. 1 and 2, a portable telephone 10 has a display panel 12 arranged at the central portion of the surface of a main body casing 11, and an open/close cover 13 disposed at the lower portion of the display panel 12.

The open/close cover 13 is rotatably attached vertically at the upper end portion thereof to the main body casing 11 by means of an axle 13A, which is parallel to the lower end rim of the display panel 12.

In addition, there is provided a control panel 14 on the portion to be covered with the open/close cover 13 of the main body casing 11. As shown in FIG. 2, on the surface of the control panel 14, there are arranged first operation keys K1 such as telephone Number input keys and function keys. Moreover, on the reverse side of the open/close cover 13 (which is the front side when the cover is opened), there are arranged second operation keys K2.

There is provided a CCD camera 18 on the upper right portion of the main body casing 11 as shown in the figures. There is also provided a spectrum dial 19 on the left such as for switching the display windows of the display panel 12.

Figure 3:
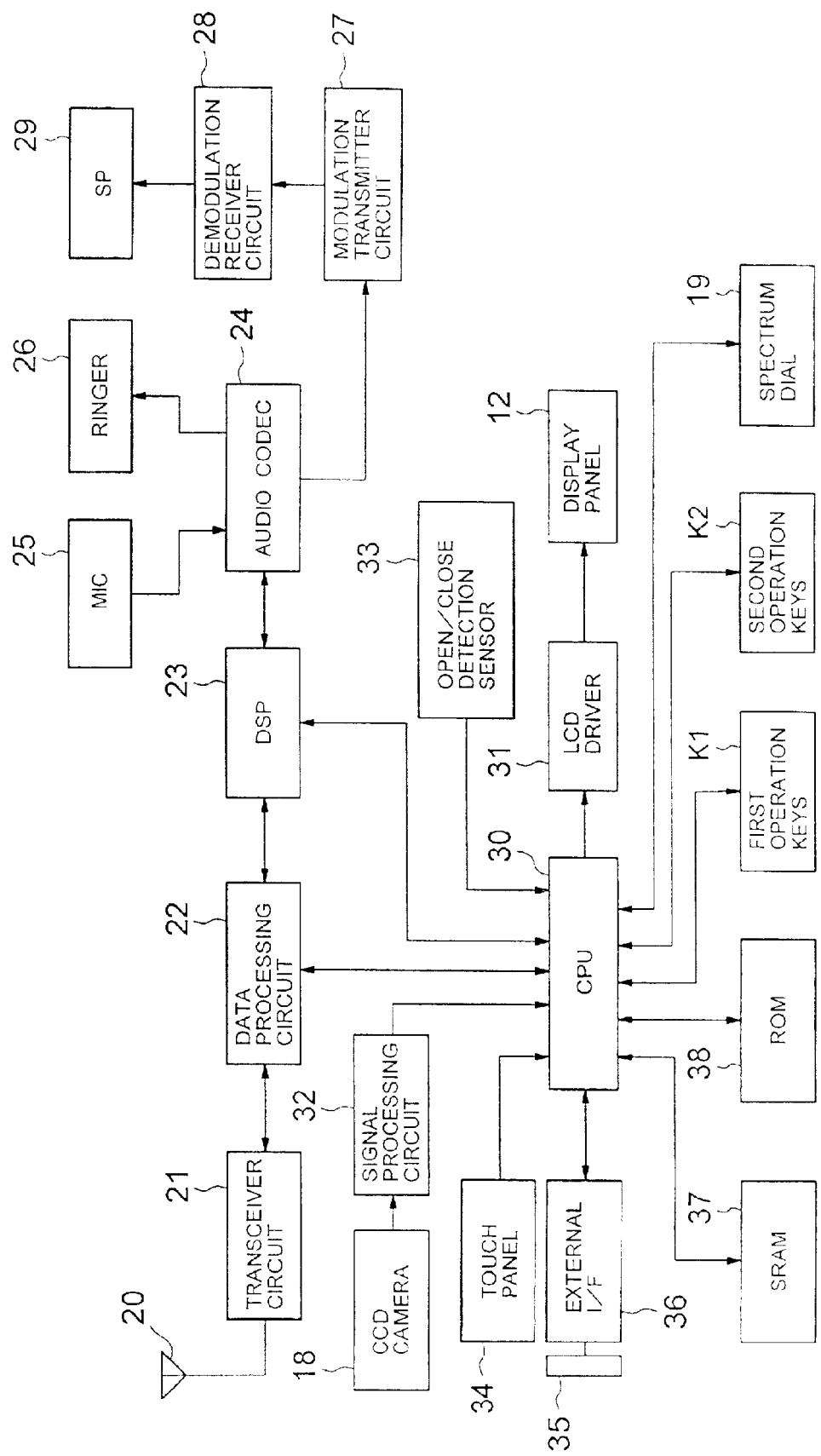
FIG. 3 is a block diagram illustrating the control portion of the portable telephone of the present invention.

FIG. 3 is a block diagram illustrating an example of the configuration of the control portion of the portable telephone 10.

Referring to FIG. 3, an antenna 20 attached to the main body casing 11 of the portable telephone 10 is successively connected with a transceiver circuit 21, a data processing circuit 22, and a high-speed processing microprocessor or a digital signal processor (DSP) 23. Here, the data processing circuit 22 performs clock control on the image and audio signals received by the transceiver circuit 21 and serves as an interface to a CPU, described later.

The DSP 23 is connected with an audio codec 24. The audio codec 24 is connected with a microphone 25 and a ringer 26. In addition, the audio codec 24 is connected with a loudspeaker 29 via a modulation transmitter circuit 27 and a demodulation receiver circuit 28.

The data processing circuit 22 and the DSP 23 are connected to the CPU 30.

In addition, the CPU 30 is connected with the display panel 12 via a LCD driver 31, the CCD camera 18 via a signal processing circuit 32, and an open/close detection sensor 33 which is attached to the open/close portion of the open/close cover 13 to detect the opened or closed status of the open/close cover 13. The CPU 30 is also connected with a touch panel 34 attached to the display panel 12. Via an external I/F 36, connected to the CPU 30 is a connector 35 which is connected to a personal computer or the like and through which various data is communicated to and from the personal computer or the like. The CPU 30 is also connected with a SRAM 37 in which various personal data are stored such as abbreviated telephone numbers to be inputted by the user. The CPU 30 is further connected with a ROM 38 in which various control programs for the portable telephone are stored. The CPU 30 is also connected with the spectrum dial 19, and the first operation keys K1 and the second operation keys K2, which contain various operation keys such as function keys and a ten-key pad for use in inputting telephone numbers.

The control portion of the portable telephone 10 allows the transceiver circuit 21 to receive a radio wave through the antenna 20. Then, the data processing circuit 22 separates the radio waves into an image signal and an audio signal. While being subjected to clock control, the image signal is outputted to the CPU 30 and the audio signal is outputted to the DSP 23 each in accordance with a command from the CPU 30.

The audio signal inputted to the DSP 23 is subjected to audio processing in the DSP 23 and then inputted to the audio codec 24 for D/A conversion. Then, the resulting signal is outputted to the loudspeaker 29 via the modulation transmitter circuit 27 and the demodulation receiver circuit 28 as well as to the ringer 26.

On the other hand, the audio signal inputted from the microphone 25 is subjected to A/D conversion in the audio codec 24. Then, the resulting signal is transmitted from the antenna 20 via the DSP 23, the data processing circuit 22, and the transceiver circuit 21.

The CPU 30 allows the various control programs of the portable telephone stored in the ROM 38 to control the operation of the data processing circuit 22, the DSP 23, the LCD driver 31 and the like.

That is, in accordance with an operation signal from the first operation keys K1 or the second operation keys K2, the CPU 30 will read a control program corresponding to the operation signal from the ROM 38. Then, in accordance with the control program that has been read, the CPU 30 will output image data of an operation window to the LCD driver 31 to allow the display panel 12 to display the operation window. In addition, the CPU 30 controls the operation of the data processing circuit 22 and the DSP 23, reads data from or writes data to the SRAM 37, and communicates data with the personal computer or the like to which the connector 35 is connected.

Furthermore, when a display window has been switched over to a new window through the spectrum dial 19, the CPU 30 reads corresponding image data read from the ROM 38 and then outputs the resulting data to the LCD driver 31, thereby allowing the new window to appear on the display panel 12.

Furthermore, upon picking-up of an image by means of the CCD camera 18, the CPU 30 will receive the image signal which is sent from the CCD camera 18 and processed in the signal processing circuit 32. Then, the CPU 30 outputs the image signal to the LCD driver 31, thereby allowing the resulting image to appear on the display panel 12.

Figure 4:
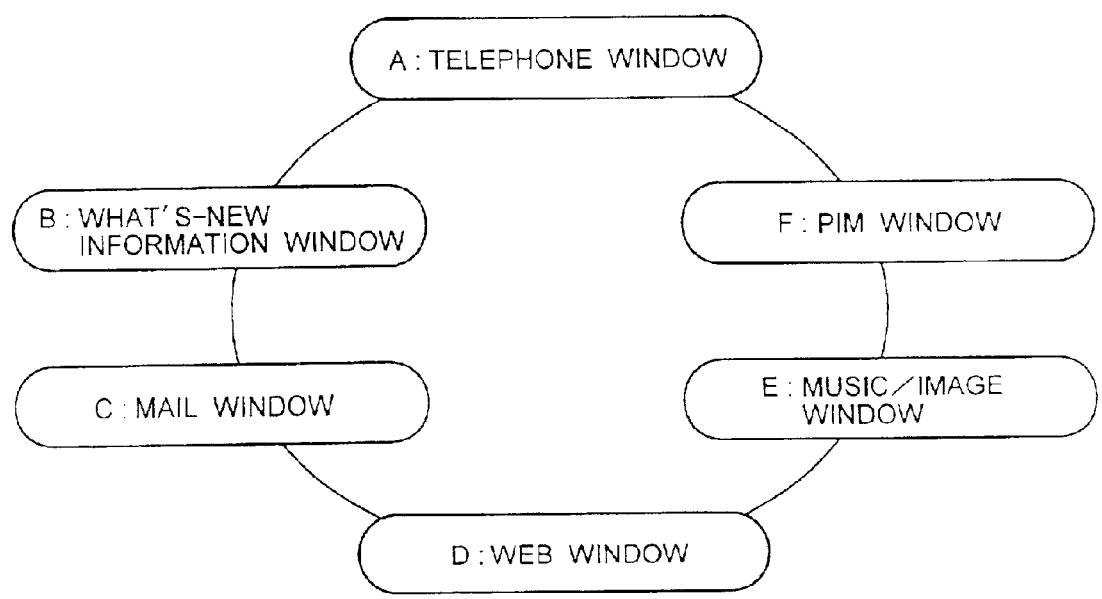
FIG. 4 is an explanatory view illustrating an arrangement of application windows according to the embodiment of the present invention.

In this example, the portable telephone 10 is equipped with six applications: telephone, what's-new, mail, Web, music/image, and PIM (Personal Information Manager) applications. As shown in FIG. 4, successively displayed on the display panel 12 through the operation of the spectrum dial 19 are a telephone window A, a what's-new window B, a mail window C, a Web window D, a music/image window E, and a PIM window F, corresponding to each of the applications.

Figure 5A:
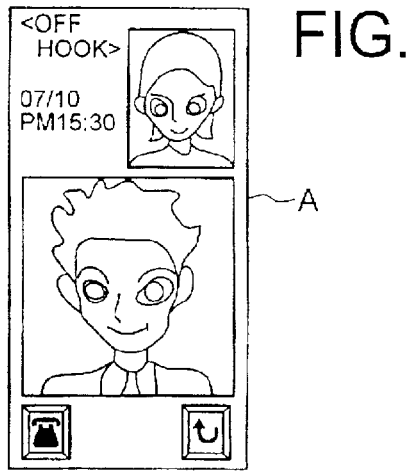
FIGS. 5A to 5F are explanatory views illustrating examples of application windows according to the embodiment of the present invention.
Figure 5B:
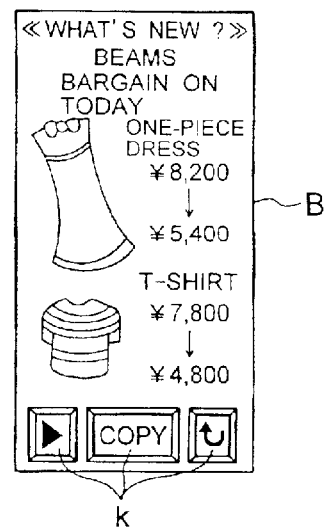
Figure 5C:
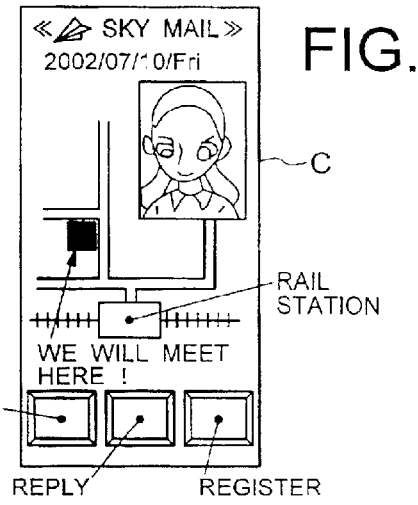
Figure 5D:
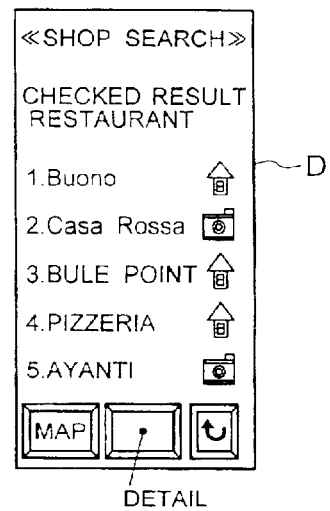
Figure 5E:
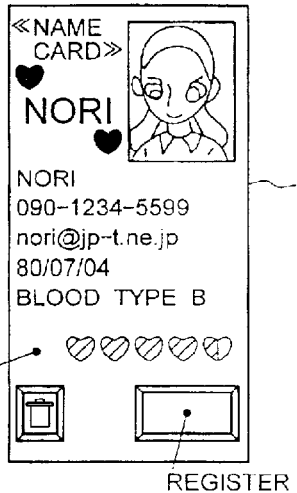
Figure 5F:
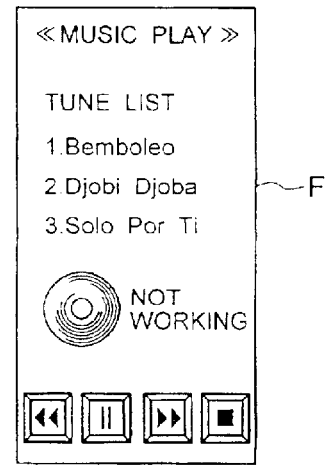

FIG. 5A shows an example of the telephone window A to be displayed on the display panel 12, FIG. 5B shows an example of the what's-new window B, FIG. 5C shows an example of the mail window C, and FIG. 5D shows an example of the Web window D. FIG. 5E shows an example of the music/image window E and FIG. 5F shows an example of the PIM window F.

Figure 6:
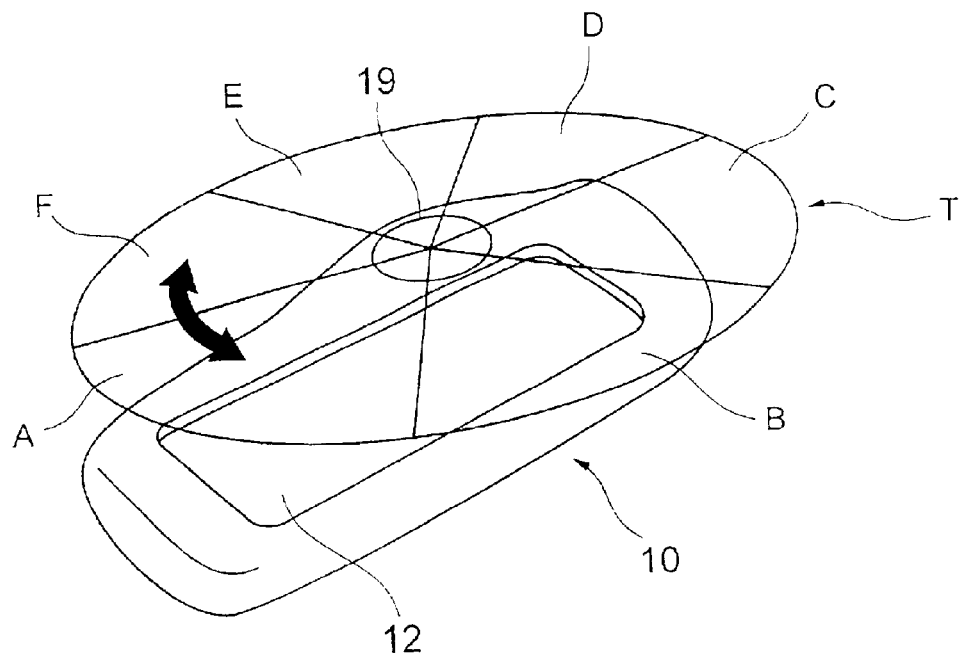
FIG. 6 is an explanatory conceptual view illustrating the display form of application windows according to the embodiment of the present invention.

FIG. 6 is a conceptual view illustrating the window image of each of the application windows A to F to be displayed on the display panel 12.

That is, the display windows A to F are conceptually each assigned to each of the six regions which are provided by radially dividing a disc T with its center at the spectrum dial 19, the display windows A to F being arranged as shown in FIG. 4. A rotational operation of the spectrum dial 19 allows the disc T to rotate about the spectrum dial 19, causing the display windows A to F on the disc T to appear successively on the display panel 12.

Incidentally, each of the regions divided radially on the disc T is provided with its own color, whereby each of the windows A to F is displayed on the display panel 12 in a different background color from any one of the other regions.

Figure 7:
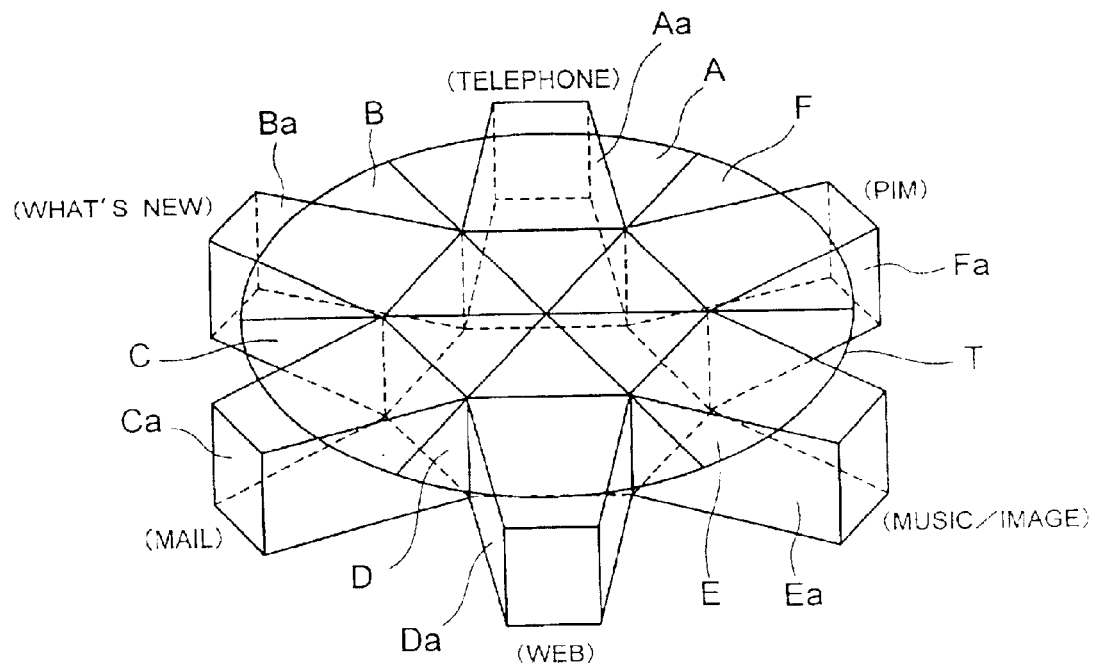
FIG. 7 is an explanatory conceptual view illustrating the form of application windows according to the embodiment of the present invention.

In addition, each of the display windows A to F is provided spatially with contents Aa to Fa corresponding to each application as conceptually expressed in FIG. 7.

Figure 8:
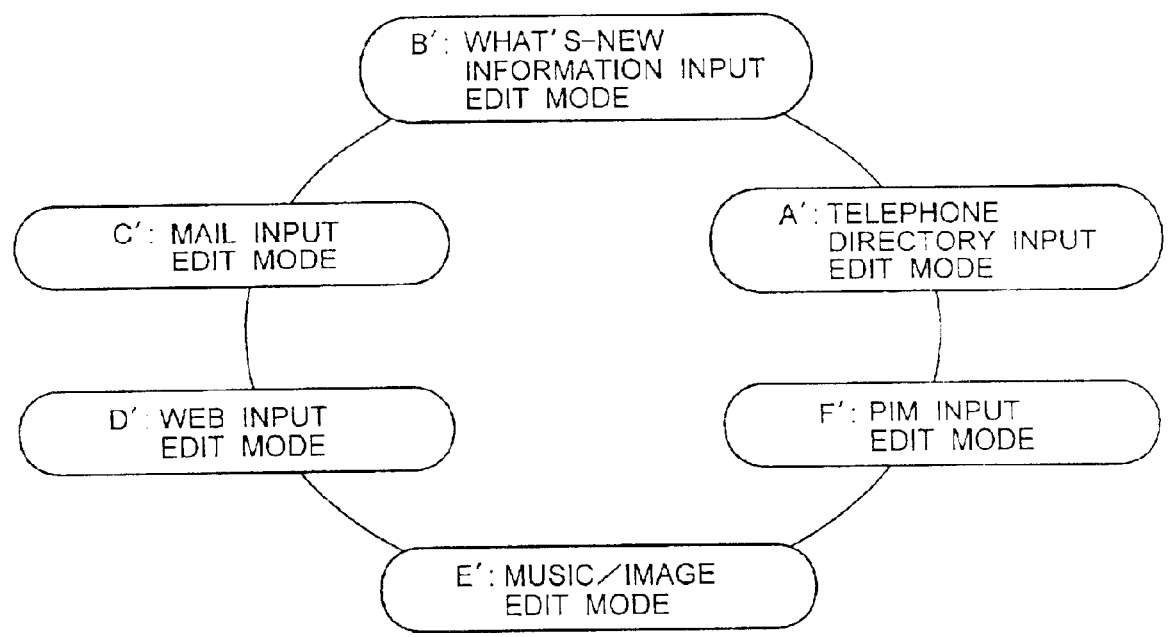
FIG. 8 is an explanatory view illustrating the concept of the arrangement of the input edit window of each application according to the embodiment of the present invention.

Furthermore, each of the applications is provided with each input edit window A' to F', which is to be displayed through a mode change in place of the windows A to F as shown in FIG. 8.

A program stored in the ROM 38 of the control portion (refer to FIG. 3) organizes the display form of the windows A to F and the input edit window A' to F' on the display panel 12, and the contents Aa to Fa each corresponding to each of the applications.

The portable telephone 10 stores a copy & paste program, described later, in the ROM 38 of the control portion for copying and pasting data between the windows A to F of the applications.

Now, the operation procedure of each of the applications equipped in the portable telephone 10 will be explained with the flowcharts of FIGS. 9 to 12.

Figure 9:
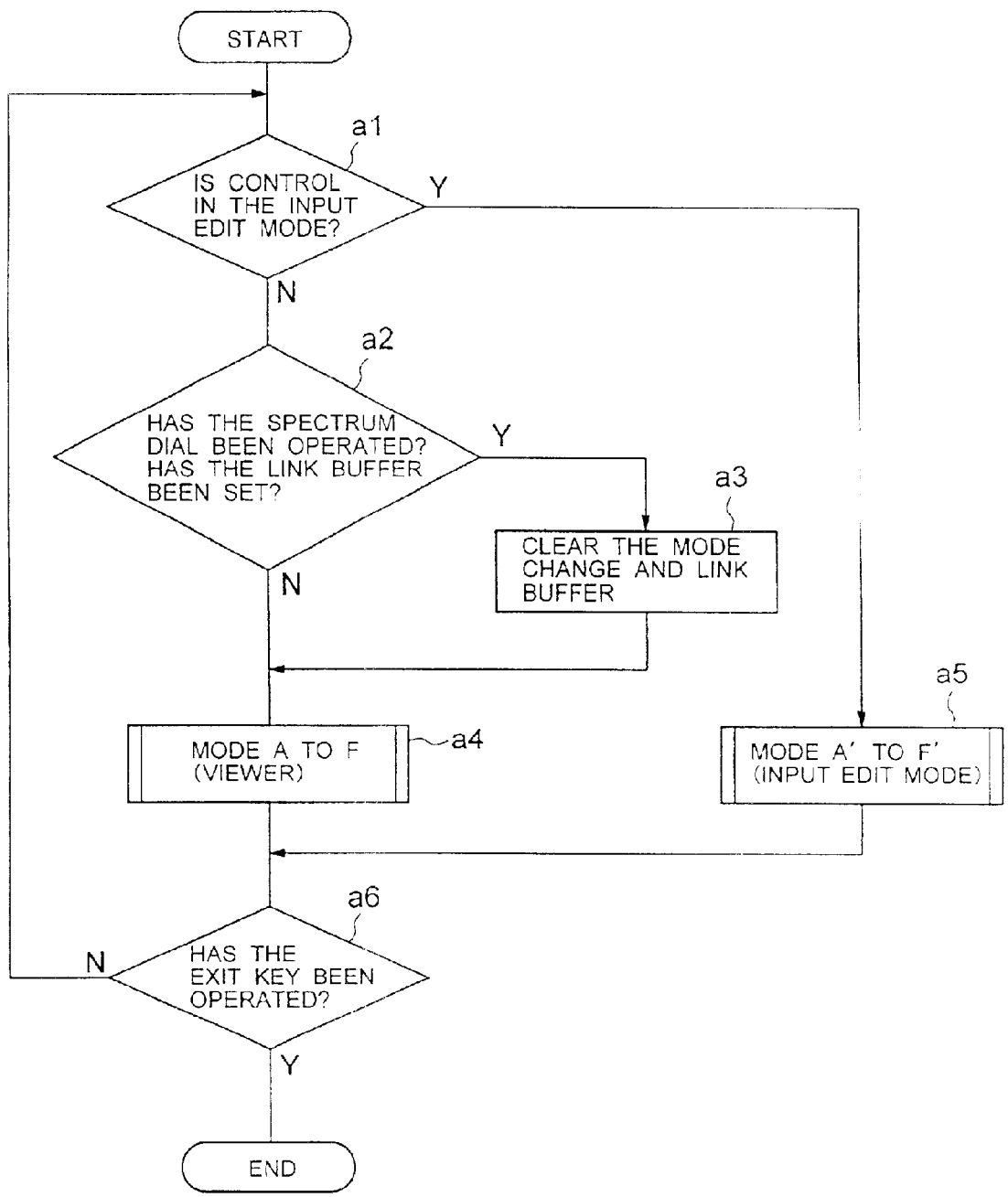
FIG. 9 is a flowchart showing the main routine of the window display control to be performed by the control portion according to the embodiment of the present invention.

FIG. 9 is a flowchart showing the main routine for the mode change (the selection of an application) of the portable telephone 10.

Referring to FIG. 9, the CPU 30 (refer to FIG. 3) determines if control is in the input edit mode (step a1). If control is not in the input edit mode, it is then determined if the spectrum dial 19 has been operated and a link buffer has been set to the application that is to be selected through the operation of the spectrum dial 19 (step a2).

In the step a2, if the spectrum dial 19 has been operated, the mode is switched over to the application that has been selected by the operation of the spectrum dial 19. In addition, if the link buffer has been set to the selected application, the buffer link is cleared (step a3).

Then, control proceeds to the viewer mode subroutine of each application (step a4).

In the step a2, if the spectrum dial 19 has not been operated, control proceeds to the subroutine of step a4 in the viewer mode of the application that has been selected in the previous operation.

On the other hand, in step a1, if control is in the input edit mode, control proceeds to the subroutine in the input edit mode of the application that has been selected in the previous operation (step a5).

Then, it is determined if the exit key has been inputted (step a6). If the exit key has not been inputted, control repeats the procedure from the aforementioned step a1. If the exit key has been inputted, control exits the viewer mode or the input edit mode of the selected application.

Figure 10:
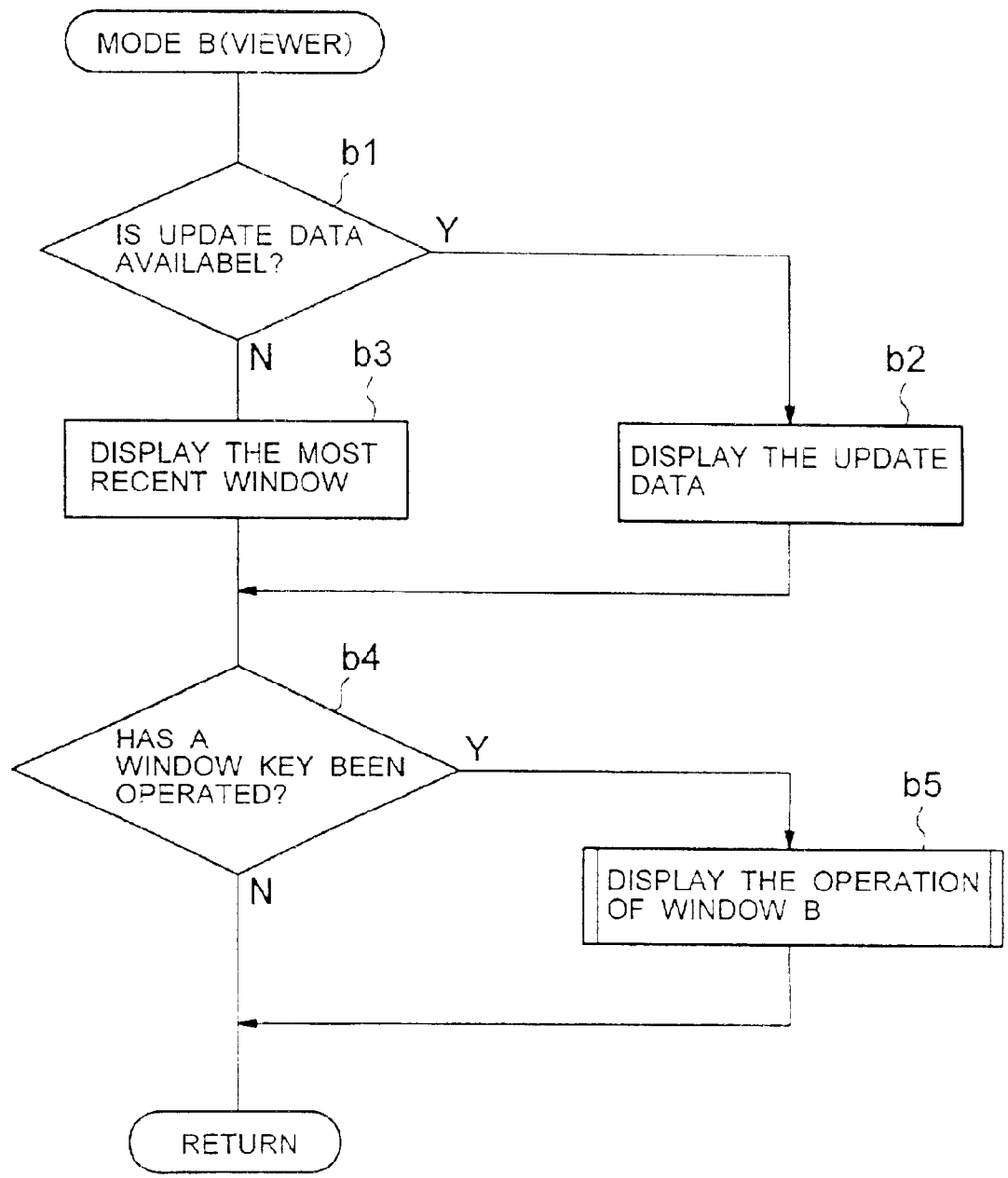
FIG. 10 is a flowchart showing a viewer mode subroutine of an application to be executed in the main routine of FIG. 9.

FIG. 10 shows the viewer mode subroutine of the selected application to be executed in step a4 in the aforementioned main routine.

Incidentally, FIG. 10 shows as an example the subroutine where the viewer mode (mode B) of the what's-new application is selected.

Referring to FIG. 10, after the what's-new application has been selected, the CPU 30 determines if up-date data is available (step b1). If up-date data is available, the CPU 30 allows the what's-new window B to appear on the display panel 12 (refer to FIG. 1) in accordance with the up-date data (step b2). If no up-date data is available, the CPU 30 allows the what's-new window B to appear on the display panel 12 in accordance with the most recent data (step b3).

Then, it is determined if window keys k (refer to FIG. 5B) for performing various operations displayed on the what's-new window B have been operated (step b4). If a window key k has been operated, control proceeds to the window operation subroutine of the what's-new window B (step b5).

If a window key k has not been operated in step b4, control returns to repeat the aforementioned procedures.

Figure 11:
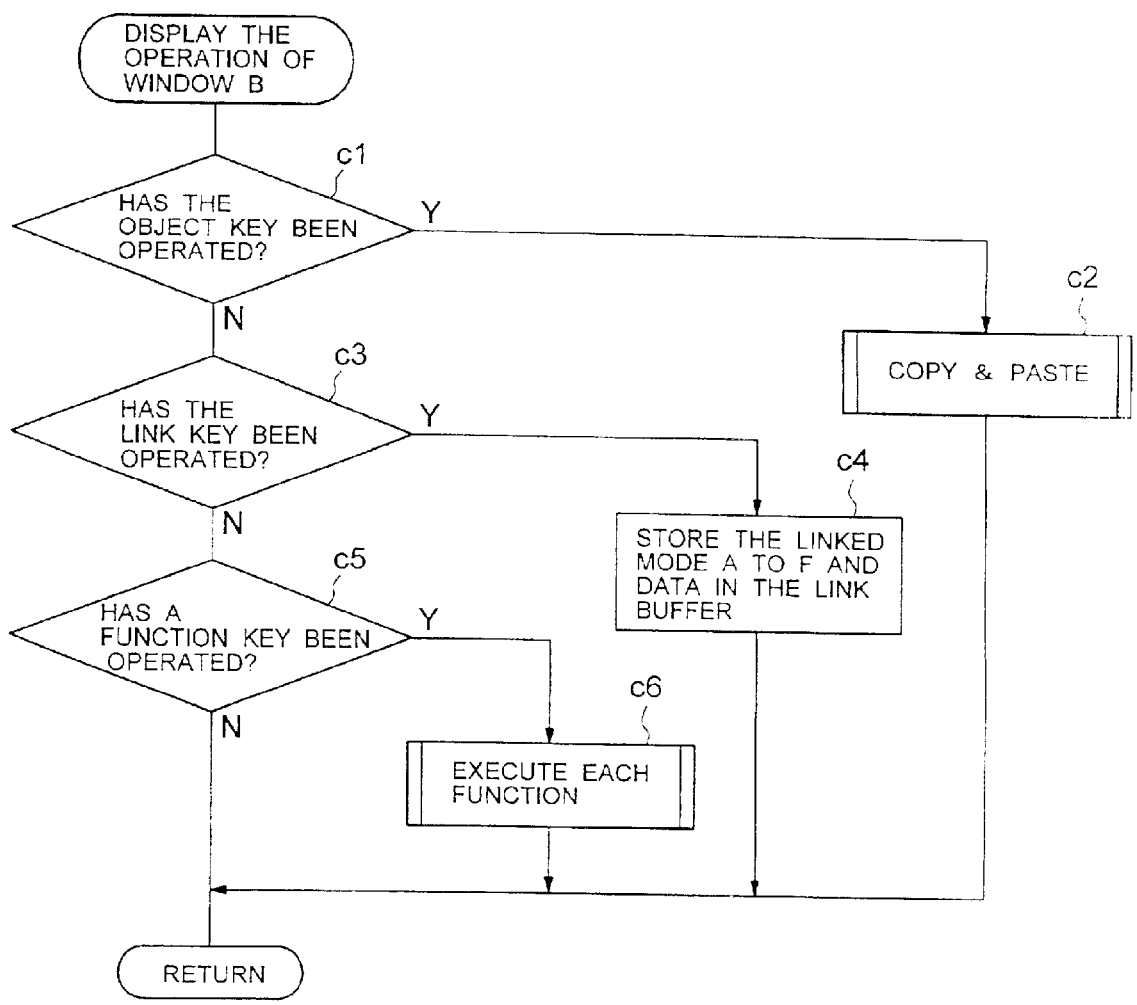
FIG. 11 is a flowchart showing the window operation subroutine in the viewer mode subroutine of FIG. 10.

FIG. 11 shows the window operation subroutine of the what's-new window B in step b5 of FIG. 10.

Referring to FIG. 11, first, it is determined if a window key k has been operated to select a given object (e.g., an image of the T-shirt of FIG. 5B) in the what's-new window B displayed on the display panel 12 (step c1). If the window key k has been operated to select the object, control proceeds to the copy & paste subroutine (step c2).

If the window key k has not been operated to select the object, it is determined if the link key of the window keys k has been operated (step c3). If the link key has been operated, the linked mode and the linked data of the what's-new window B are stored in the link buffer (step c4).

If the link key has not been operated in step c3, it is determined if another function key of the window keys k has been operated (step c5). If a function key has been operated, control proceeds to the subroutine for executing the corresponding function (step c6). If a function key has not been operated, control return to repeat the aforementioned procedures.

Now, the copy & paste subroutine in step c2 of the aforementioned window operation subroutine will be explained with reference to the flowchart of FIG. 12 and the operation explanatory views illustrating the form of the windows displayed on the display panel 12 shown in FIGS. 13 to 17.

Figure 12:
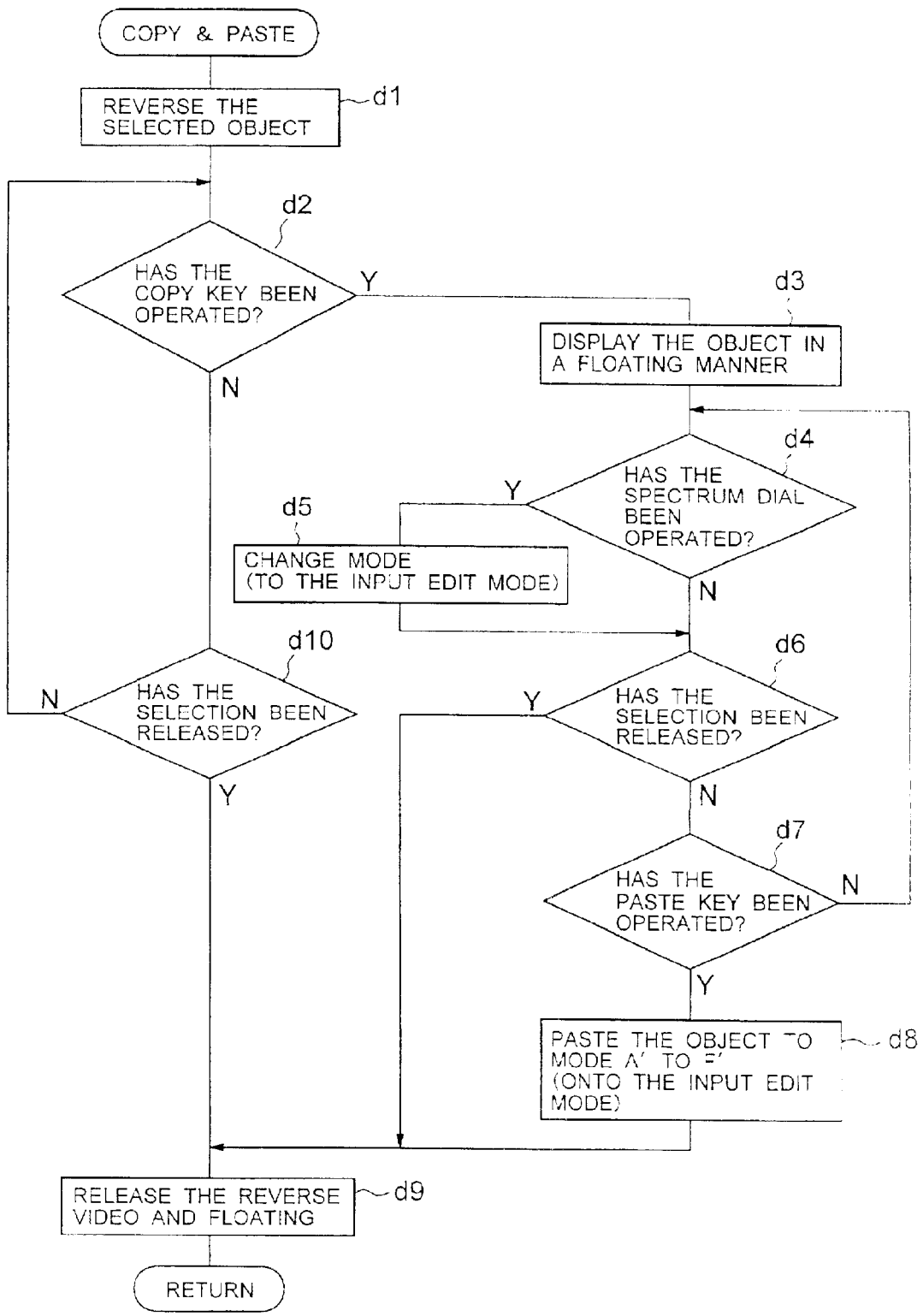
FIG. 12 is a flowchart showing the copy and paste subroutine of the window operation subroutine of FIG. 11.
Figure 13:
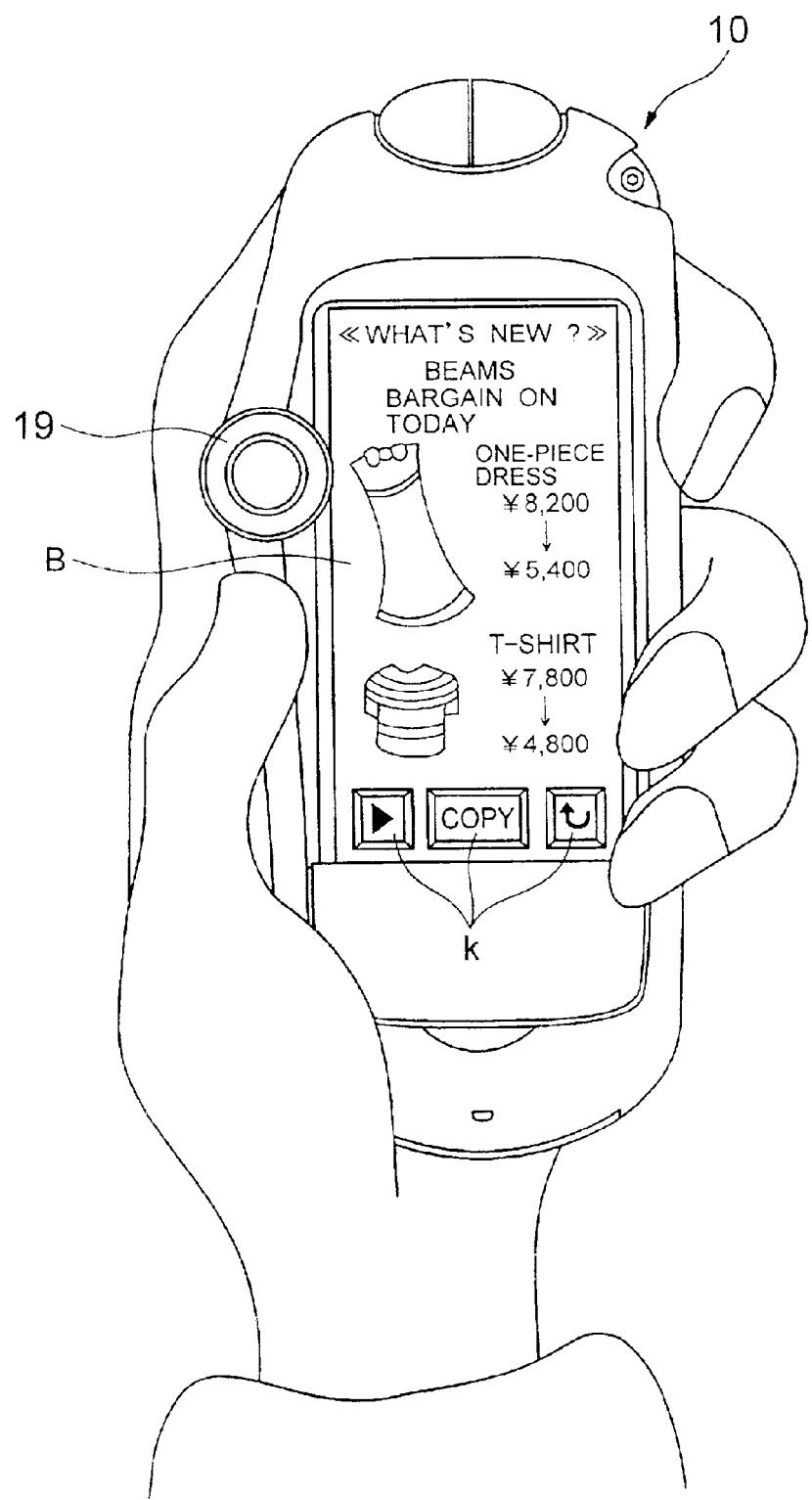
FIG. 13 is an explanatory view illustrating the form of a window during the copy and paste operation according to the embodiment of the present invention.
Figure 14:
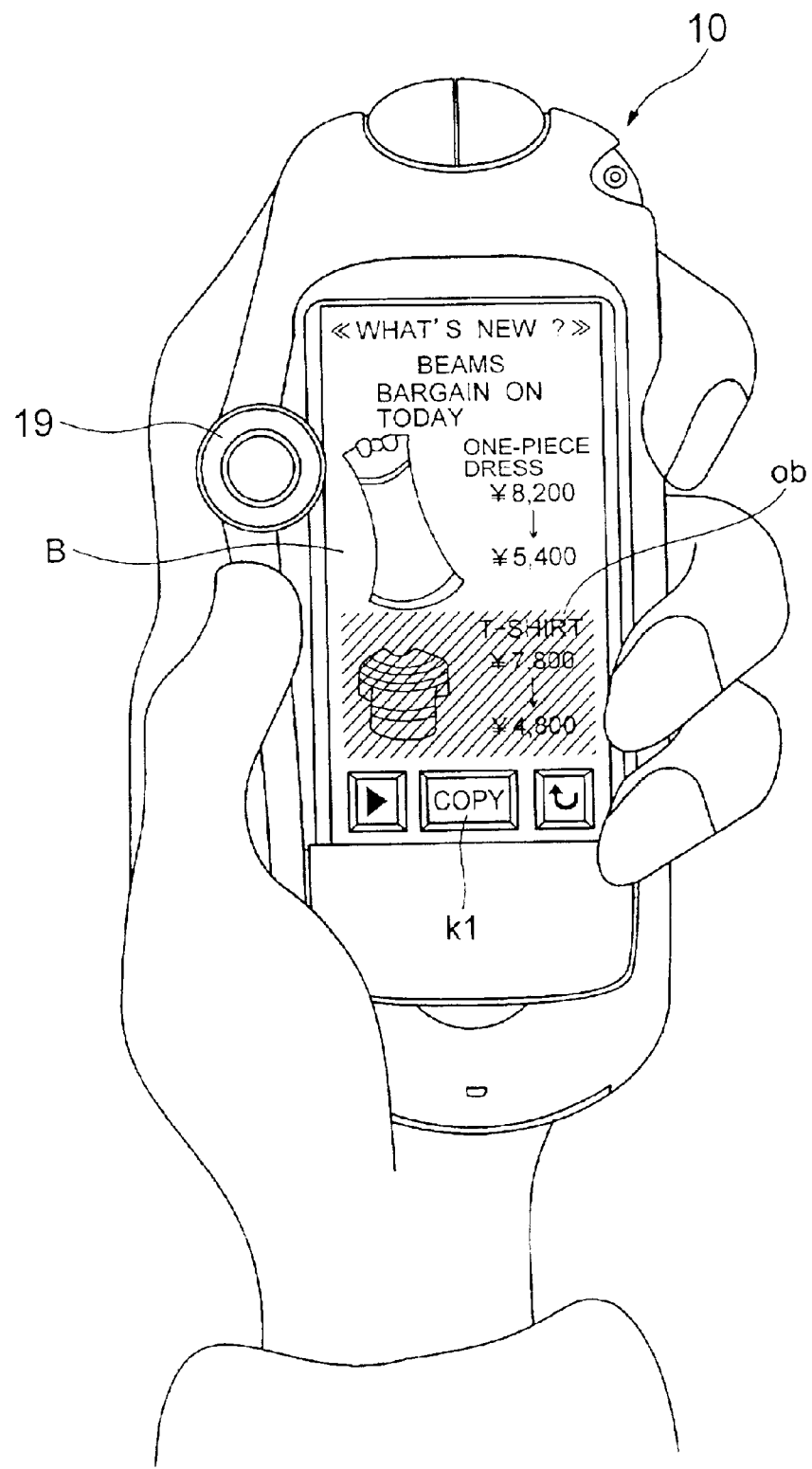
FIG. 14 is an explanatory view illustrating the form of a window during the copy and paste operation according to the embodiment of the present invention.

With the what's-new window B appearing on the display panel 12 of the portable telephone 10 as shown in FIG. 13 in the aforementioned subroutine of FIG. 10, suppose a window key k displayed on the window is operated to select the desired object to be copied in the what's-new window B. In this case, in FIG. 12, the CPU 30 displays the selected object ob in the reverse video as shown in FIG. 14 (step d1).

Then, it is determined if the copy key k1 arranged as a window key k has been operated (step d2). If the copy key k1 has been operated, the selected object ob that has been displayed in the reverse video in step d1 is floated in the what's-new window B (step d3).

The floating means that the selected object ob displayed in the reverse video is so displayed on the display panel 12 such that the user feels that the object is floating over the other display portion of the window.

Then, the CPU 30 determines if the spectrum dial 19 has been operated (step d4). If the spectrum dial 19 has been operated, the CPU 30 allows the input edit window A' to F' of the other modes to be successively displayed to the operation of the spectrum dial 19, with the selected object ob being displayed in floating on the display panel 12, thereby performing the mode change (step d5).

Figure 15:
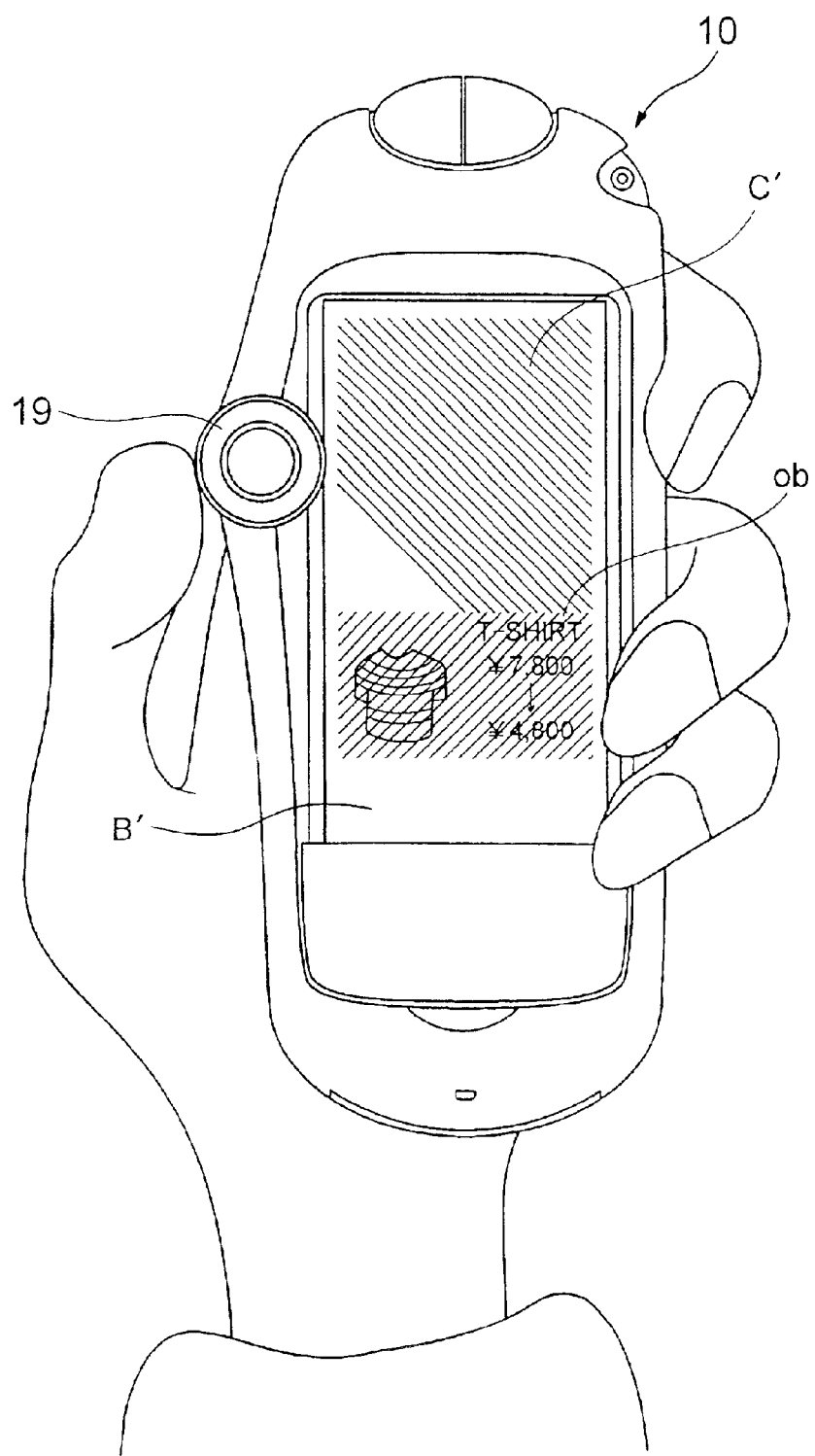
FIG. 15 is an explanatory view illustrating the form of a window during the copy and paste operation according to the embodiment of the present invention.

That is, as shown in FIG. 15, suppose the spectrum dial 19 is rotated after the selected object ob is displayed in a floating manner. In this case, on the display panel 12, with the selected object ob being displayed in floating on the display panel 12, the background behind the selected object ob is successively changed to the input edit window A' to F' shown in FIG. 8 in that order in such a manner that the disc T, described in FIG. 6, is conceptually rotated.

Accordingly, of the input edit windows A' to F', the target input edit window for pasting the selected object ob is displayed on the display panel 12 and the operation of the spectrum dial 19 is stopped. Then, the CPU 30 determines if the selected object ob has been released (step d6). If the selected object ob has not been released, it is then determined if the paste key k2 arranged as a window key k has been operated (step d7).

Figure 16:
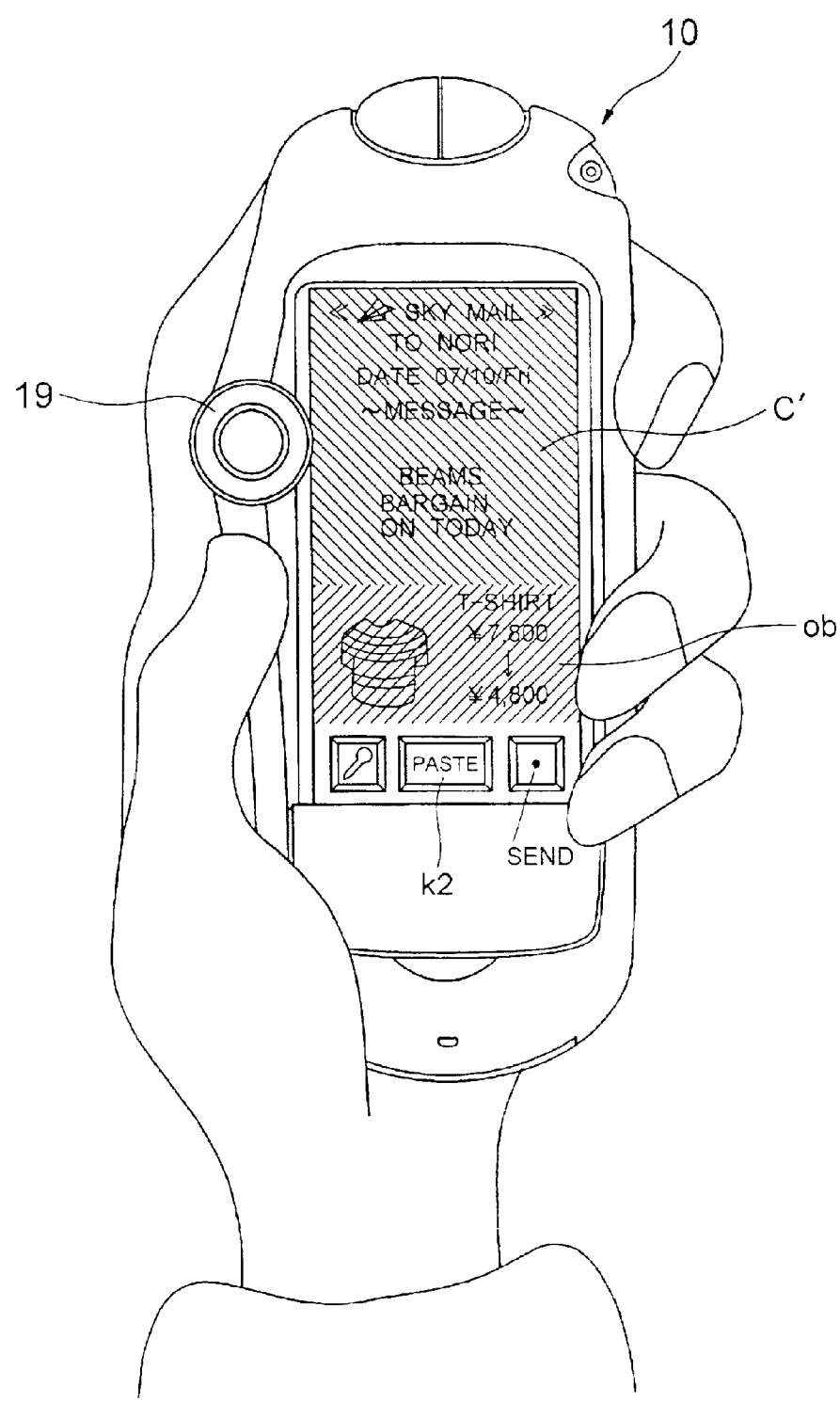
FIG. 16 is an explanatory view illustrating the form of a window during the copy and paste operation according to the embodiment of the present invention.

In step d7, as shown in FIG. 16, if the paste key k2 has been operated, the selected object ob is pasted on a given input edit window A' to F' (on the mail input edit window C' in the example shown) of the input edit window A' to F', which is displayed behind the selected object ob (step d8).

Figure 17:
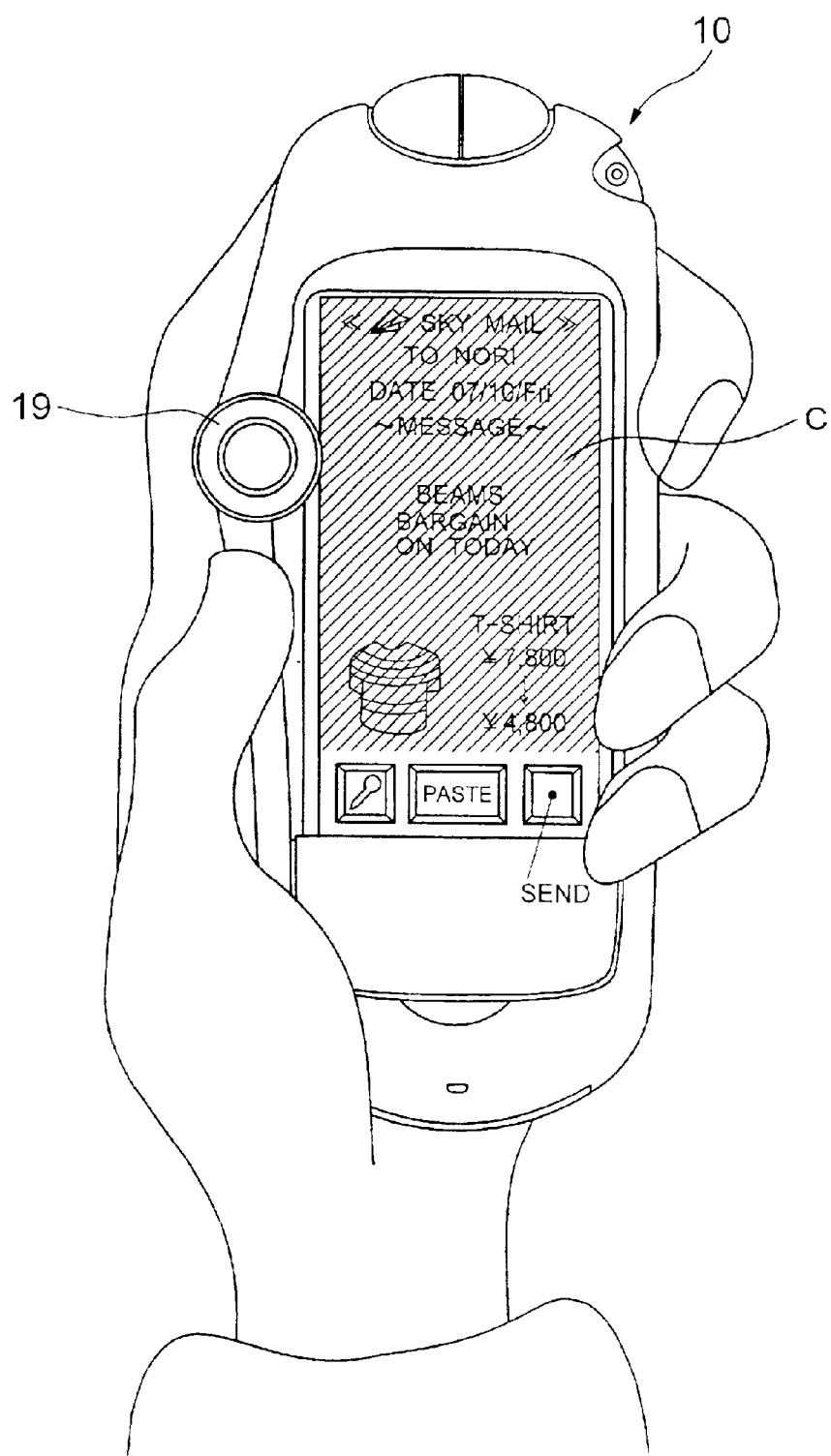
FIG. 17 is an explanatory view illustrating the form of a window during the copy and paste operation according to the embodiment of the present invention.

Thus, the selected object ob described above is completed. Then, the CPU 30 releases the selected object ob displayed in the reverse video and in a floating manner. Thereafter, as shown in FIG. 17, in an selected input edit window A' to F' (the mail input edit window C' in the example shown), the CPU 30 allows the new window A to F (the mail window C in the example shown), to which the selected object ob has been pasted, to be edited (step d9).

Suppose it is determined in step d2 that the copy key has not been operated and in step d10 that the selected object ob has been released. In this case, the selected object ob highlighted in step d9 and in a floating manner are also released.

Incidentally, in the foregoing, objects are selected and the keys are operated for input as follows. That is, the user is allowed to touch the position where the object or the key is displayed on the display panel 12. Then, the CPU 30 detects the position touched by the user by means of the touch panel 34 (refer to FIG. 3) attached to the display panel 12.

Incidentally, the subroutine of FIGS. 10 to 12 in the foregoing has been explained referring to the operation in the what's-new information mode as an example. However, the operation in the other modes can be performed in the same manner.

This application is based on Japanese Patent Application No. 2000-185806 which is hereby incorporated by reference.

What is claimed is:

1. A portable information terminal equipped with a plurality of application programs, a display part, and an operating part for displaying an application window on the display part, said portable information terminal comprising an image range specifying part for specifying an image within a given range in a given application window displayed in said display portion, a copying part for copying the image within the range specified by the image range specifying part and for allowing the copied image to remain displayed on the display portion even when the application window displayed on the display portion is changed by said operation portion, and a pasting part for pasting the image within the specified range, remaining displayed on the display portion by the copying part, onto a window of a changed other application displayed on the display portion.

2. The portable information terminal according to claim 1, further comprising an image reversing part for reversing the image specified by said image range specifying part.

3. The portable information terminal according to claim 1, further comprising:

a display form changing part for displaying the image copied by said copying part in such a manner as to seemingly float over the window displayed on the display portion.

4. The portable information terminal according to claim 1, further comprising:

a window displaying part for allowing an operation of said operation portion to display a plurality of application windows one after the other on the display portion in a sliding manner.

5. The portable information terminal according to claim 4, wherein said window displaying part displays a plurality of application windows in background colors different from each other.

6. The portable information terminal according to claim 4, wherein said operating part allows a dial to be rotated to slide a plurality of application windows and thus display the application windows successively on the display part.

* * * * *